United States Patent
Johnson, Jr. et al.

(10) Patent No.: US 8,527,302 B2
(45) Date of Patent: Sep. 3, 2013

(54) MANAGING AN INSURANCE PLAN

(75) Inventors: William Joseph Johnson, Jr., East Sandwich, MA (US); Mark C. Leonard, North Reading, MA (US); Ross Mark Krinsky, Southborough, MA (US); Stephen Luke Deschenes, Wellesley, MA (US)

(73) Assignee: FMR LLC, Boston, MA (US)

( * ) Notice: Subject to any disclaimer, the term of this patent is extended or adjusted under 35 U.S.C. 154(b) by 1016 days.

(21) Appl. No.: 11/964,980

(22) Filed: Dec. 27, 2007
(Under 37 CFR 1.47)

(65) Prior Publication Data
US 2009/0171831 A1 Jul. 2, 2009

(51) Int. Cl.
*G06Q 40/00* (2012.01)

(52) U.S. Cl.
USPC .................................. 705/4; 705/37

(58) Field of Classification Search
USPC .................................. 705/4, 36 R
See application file for complete search history.

(56) References Cited

U.S. PATENT DOCUMENTS

2002/0046067 A1* 4/2002 Kraehenbuehl et al. .......... 705/4
2002/0143584 A1* 10/2002 Lundegren ........................ 705/4

OTHER PUBLICATIONS

D. Wray, "Best laid plans," Human ResourceManagement, http://www.hrmreoprt.com/pastissue/article.aso?art=26494&issue=160, 5 pages, undated.

* cited by examiner

*Primary Examiner* — Ojo O Oyebisi
(74) *Attorney, Agent, or Firm* — Proskauer Rose LLP

(57) ABSTRACT

Described are computer-based methods and apparatuses, including computer program products, for managing insurance plans. Multiple bids are received from multiple reinsurance companies for the price of a unit of an insurance product (e.g., a fixed annuity paying ten dollars a month starting at the age of sixty five). The unit of the insurance product is associated with a set of one or more risk factors (e.g., age, range of ages). A bid is selected from the bids based on a relationship between the bids (e.g., lowest bid, lowest weighted bid). The selected bid is associated with a selected reinsurance company. Units of the insurance product associated with the selected bid are offered to participants associated with the set of one or more risk factors.

26 Claims, 9 Drawing Sheets

MANAGING AN INSURANCE PLAN

FIELD OF THE INVENTION

The present invention relates generally to methods and systems, including computer program products, for managing an insurance plan.

BACKGROUND

In general, retirement plans come in two varieties: Defined Benefit plans and Defined Contribution plans. The Defined Benefit plan provides a defined benefit to a participant based on various factors including the participant's age at retirement and years of employment. In contrast, the Defined Contribution plan provides a benefit to a participant based on the total amount of money the participant contributes to the plan and any gains or losses from investing those contributions. Examples of Defined Contribution plans include money purchase plans and 401(k) plans. In recent years, Defined Benefit plans are giving way to Defined Contribution plans because employers would prefer to avoid the earnings volatility associated with Defined Benefits plans.

When Defined Contribution plan participants retire, they often use part of their retirement benefits to purchase an annuity because it provides a guaranteed income stream. In general, annuities are defined by a point of purchase and a point of distribution. The point of purchase is the time at which an annuitant purchases an annuity and the point of distribution is the time at which income payment are begun. One example type of annuity is an immediate annuity. For an immediate annuity, the point of purchase and the point of distribution are the same and the annuitant receives regular income payments for her life similar to the Defined Benefit plan. Another example type of annuity is a deferred annuity. The purchase price for the deferred annuity is typically based on an interest rate and longevity statistics. When the annuitant reaches a pre-specified age (point of distribution), income payments are made to the annuitant for his life. A few employer-sponsored Defined Contribution plans optionally incorporate a deferred annuity feature for those employees desiring a guaranteed income stream at retirement.

SUMMARY OF THE INVENTION

One approach to offering an insurance plan is a method. The method includes receiving a first plurality of bids from a first plurality of reinsurance companies for a price of a first unit of a first insurance product. The first unit of the first insurance product is associated with a first set of one or more risk factors. The method further includes selecting a first bid associated with a first reinsurance company from the first plurality of bids based on a relationship of the first bid to the first plurality of bids. The method further includes receiving a second plurality of bids from a second plurality of reinsurance companies for a price of a second unit of the first insurance product. The second unit of the first insurance product being associated with a second set of one or more risk factors. The method further includes selecting a second bid associated with a second reinsurance company from the second plurality of bids based on a relationship of the second bid to the second plurality of bids. The method further includes offering the insurance plan to a first set of participants associated with the first set of one or more risk factors and a second set of participants associated with the second set of one or more risk factors. The insurance plan includes at least one part of a first unit of the first insurance product from the first insurance company and at least one part of a second unit of the first reinsurance product from the second reinsurance company.

Another approach to managing an insurance product is a method. The method includes purchasing first assets for the insurance product based on information associated with a purchase of a first set of one or more parts of a unit or units of the first insurance product. The first set of one or more parts of the unit or units of the insurance product are selected based on a relationship of a bid received from the first reinsurance company with bids received from a plurality of reinsurance companies. The method further includes purchasing second assets for the insurance product based on information associated with a purchase of a second set of one or more parts of a unit or units of the insurance product. The second set of one or more parts of a unit or units of the insurance product are selected based on a relationship a bid received from the second reinsurance company with bids received from a plurality of reinsurance companies. The method further includes managing the first assets by the first reinsurance company and managing the second assets by the second reinsurance company.

Another approach to managing an insurance product is a method. The method includes purchasing first assets for the insurance product based on information received from a first reinsurance company and information associated with a purchase of a first set of one or more parts of a unit or units of the first insurance product. The first set of one or more parts of the unit or units of the insurance product are selected based on a relationship of a bid received from the first reinsurance company with bids received from a plurality of reinsurance companies. The method further includes purchasing second assets for the insurance product based on information received from a second reinsurance company and information associated with a purchase of a second set of one or more parts of a unit or units of the insurance product. The second set of one or more parts of a unit or units of the insurance product are selected based on a relationship of a bid received from the second reinsurance company with bids received from a plurality of reinsurance companies. The method further includes managing the first assets based on information received from the first reinsurance company and the second assets based on information received from the second reinsurance company. The method further includes determining on a periodic basis if first reserve assets are equal to first liabilities for the first set of one or more parts of the unit or units of the insurance product and if second reserve assets are equal to second liabilities for the second set of one or more parts of the unit or units of the insurance product.

Another approach to managing a fixed annuity for a retirement plan is a method. The method includes receiving a first plurality of bids for a price of one or more parts of a first unit or first units of a fixed annuity. The one or more parts of a first unit or first units of the fixed annuity being associated with an age. The method further includes selecting a first bid associated with a first reinsurance company from the first plurality of bids based on a relationship between the first bid and the first plurality of bids. The method further includes offering the one or more parts of the first unit or first units of the fixed annuity associated with the first bid to one or more participants of the retirement plan associated with the age. The method further includes receiving a request from the one or more participants for the purchase of one or more of the one or more parts of the first unit or first units of the fixed annuity associated with the first bid associated with the first reinsurance company. The method further includes purchasing first assets for the one or more parts of the first unit or first units of the fixed annuity based on information received from the first reinsurance company. The method further includes managing, by a third insurance company, the first assets for the fixed annuity based on information received from the first reinsurance company and second assets for the fixed annuity based on information received from a second reinsurance company. The second assets being associated with one or more parts of a second unit or second units of the fixed annuity. The method further includes determining, by the third insurance company, on a periodic basis if first reserve assets are equal to first liabilities for the one or more parts of the first unit or first units of the fixed annuity and if second reserve assets are equal to second liabilities for the one or more parts of the second unit or second units of the fixed annuity.

Another approach to offering an insurance plan is a computer program product. The computer program product is tangibly embodied in an information carrier. The computer program product includes instructions being operable to cause a data processing apparatus to receive a first plurality of bids from a first plurality of reinsurance companies for a price of a first unit of a first insurance product. The first unit of the first insurance product being associated with a first set of one or more risk factors. A first bid associated with a first reinsurance company is selected from the first plurality of bids based on a relationship of the first bid to the first plurality of bids. A second plurality of bids are received from a second plurality of reinsurance companies for a price of a second unit of the first insurance product. The second unit of the first insurance product being associated with a second set of one or more risk factors. A second bid associated with a second reinsurance company is selected from the second plurality of bids based on a relationship of the second bid to the second plurality of bids. The insurance plan is offered to a first set of participants associated with the first set of one or more risk factors and a second set of participants associated with the second set of one or more risk factors. The insurance plan comprising at least one part of a first unit of the first insurance product from the first insurance company and at least one part of a second unit of the first reinsurance product from the second reinsurance company.

In other examples, any of the approaches above can include one or more of the following features. A request is received from one or more participants of the first set of participants for the purchase of one or more parts of the first unit or first units of the first insurance product associated with the first bid associated with the first reinsurance company. Assets and liabilities associated with the first insurance product are updated based on the request. Information associated with each of the one or more participants associated with the request is updated.

In some examples, income payments are transmitted to each of the one or more participants associated with the first insurance plan for income earned from the units associated with each of the one or more participants. The income payments are transmitted by the first reinsurance company. The information associated with each of the one or more participants associated with the request includes accumulated units purchased, a current value of the units purchased, and/or a future income value of the units purchased. A predetermined percentage of the assets is transmitted to the first reinsurance company associated with the first insurance product to compensate the first reinsurance company.

In other examples, a third plurality of bids are received from a third plurality of reinsurance companies for a price of a first unit of a second insurance product. The first unit of the second insurance product is associated with a third set of one or more risk factors. A third bid associated with a third reinsurance company is selected from the third plurality of bids based on a relationship of the third bid to the third plurality of bids. A fourth plurality of bids are received from a fourth plurality of reinsurance companies for a price of a second unit of the second insurance product. The second unit of the second insurance product being associated with a fourth set of one or more risk factors. A fourth bid associated with a fourth reinsurance company is selected from the fourth plurality of bids based on a relationship of the fourth bid to the fourth plurality of bids. The insurance plan is offered to a third set of participants associated with the third set of one or more risk factors and a fourth set of participants associated with the fourth set of one or more risk factors. The insurance plan includes at least one part of a first unit of the second insurance product from the third reinsurance company and at least part of a second one unit of the second insurance product from the fourth reinsurance company.

In some examples, the risk factors include age, gender, geographic region, profession, and/or interest rate. The first insurance product includes an annuity, a income fixed annuity, a deferred income fixed annuity, a variable annuity, an equity indexed annuity, an annuity associated with life insurance, and/or an annuity associated with an investment. The insurance plan is part of a qualified plan, a qualified retirement plan, and/or a plan in which the insurance product is individually purchased.

In other examples, the relationship between the first bid and the first plurality of bids is a lowest bid and/or a weighted bid. A relationship of the first bid and the first plurality of bids is determined by weighting the first plurality of bids based on information associated with the first plurality of reinsurance companies.

In some examples, the purchase of the first assets is associated with a request by a participant of an insurance plan. The purchase of the second assets is associated with a request by a participant of an insurance plan. The purchase of the first assets is by a third insurance company. The purchase of the second assets is by a third insurance company. The managing is by a third insurance company.

In other examples, the managing further includes managing, by the first reinsurance company, the first assets based on information received from the first reinsurance company and managing, by the second reinsurance company, the second assets based on information received from the second reinsurance company.

In some examples, a third insurance company manages the first liabilities associated with the first set of one or more parts of the unit or units of the insurance product based on information received from the first reinsurance company and the second liabilities associated with the second set of one or more parts of the unit or units of the insurance product based on information received from the second reinsurance company.

In other examples, a payment is transmitted to the first reinsurance company for the managing the first liabilities for the first set of one or more parts of the unit or units of the insurance product and a payment is transmitted to the second reinsurance company for the managing the second liabilities for the second set of one or more parts of the unit or units of the insurance product.

In some examples, a payment is transmitted to the first reinsurance company for the managing the first assets. A payment is transmitted to the first reinsurance company for assuming risks associated with the first set of one or more parts of the unit or units of the insurance product. The risks include credit risk, longevity risk, policyholder behavior risk, reinvestment risk, and/or Asset Liability Management (ALM) risk.

In other examples, a message is transmitted to the first reinsurance company if the first reserve assets are greater or less than the first liabilities. The periodic basis is a predefined time. The predefined time is one day, one month, three months, one year, or one pay period.

In some examples, a reinsurance product is selected for the insurance product. A payment is transmitted to a fourth reinsurance company associated with the reinsurance product.

In other examples, a second plurality of bids for a price of the one or more parts of the second unit or second units of the fixed annuity are received. The one or more parts of the second unit or second units of the fixed annuity being associated with the age. A second bid associated with the second reinsurance company is selected from the second plurality of bids based on a relationship between the second bid and the second plurality of bids. The one or more parts of the second unit or second units of the fixed annuity associated with the second bid are offered to one or more participants of the retirement plan associated with the age. A request from the one or more participants for the purchase of one or more of the one or more parts of the second unit or second units of the fixed annuity associated with the second bid associated with the second reinsurance company is received. The second assets for the one or more parts of the second unit or second units of the fixed annuity based on information received from the second reinsurance company is purchased.

Any of the approaches and/or examples described above may include one or more of the following advantages. Insurance products can be offered to persons, such as employees and participants of a retirement plan, at competitive prices, which are typically lower overall cost than any one traditional insurance plan. These insurance products can provide more security over the course of the participant's employment. The risk to the administrator of a defined contribution plan can be reduced so that a failed insurance company will not cause significant or disastrous consequences. An independent analysis of the insurance product's paying ability and creditworthiness can be provided.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

As a general overview of the Applicants' technology, this description includes a technique in which an insurance product, for example an annuity, is offered to participants, for example, employees of a company, through an insurance plan, for example, as part of a defined contribution retirement account. In this technique, bids are received from multiple reinsurance companies that sell the particular insurance product. The bids are typically associated with a particular unit of the insurance product. The unit of the insurance product is associated with a set of one or more risk factors (e.g., age, range of ages, etc.). For example, units of an annuity product can be based on the current age of the participant purchasing the insurance product. For each unit, a lowest bid is selected from all of received bids. The lowest bid is associated with a selected insurance company. When a participant purchases one or more units of the insurance product through the insurance plan, those one or more units are purchased from the reinsurance company that submitted the lowest bid for that particular unit.

Figure 1:
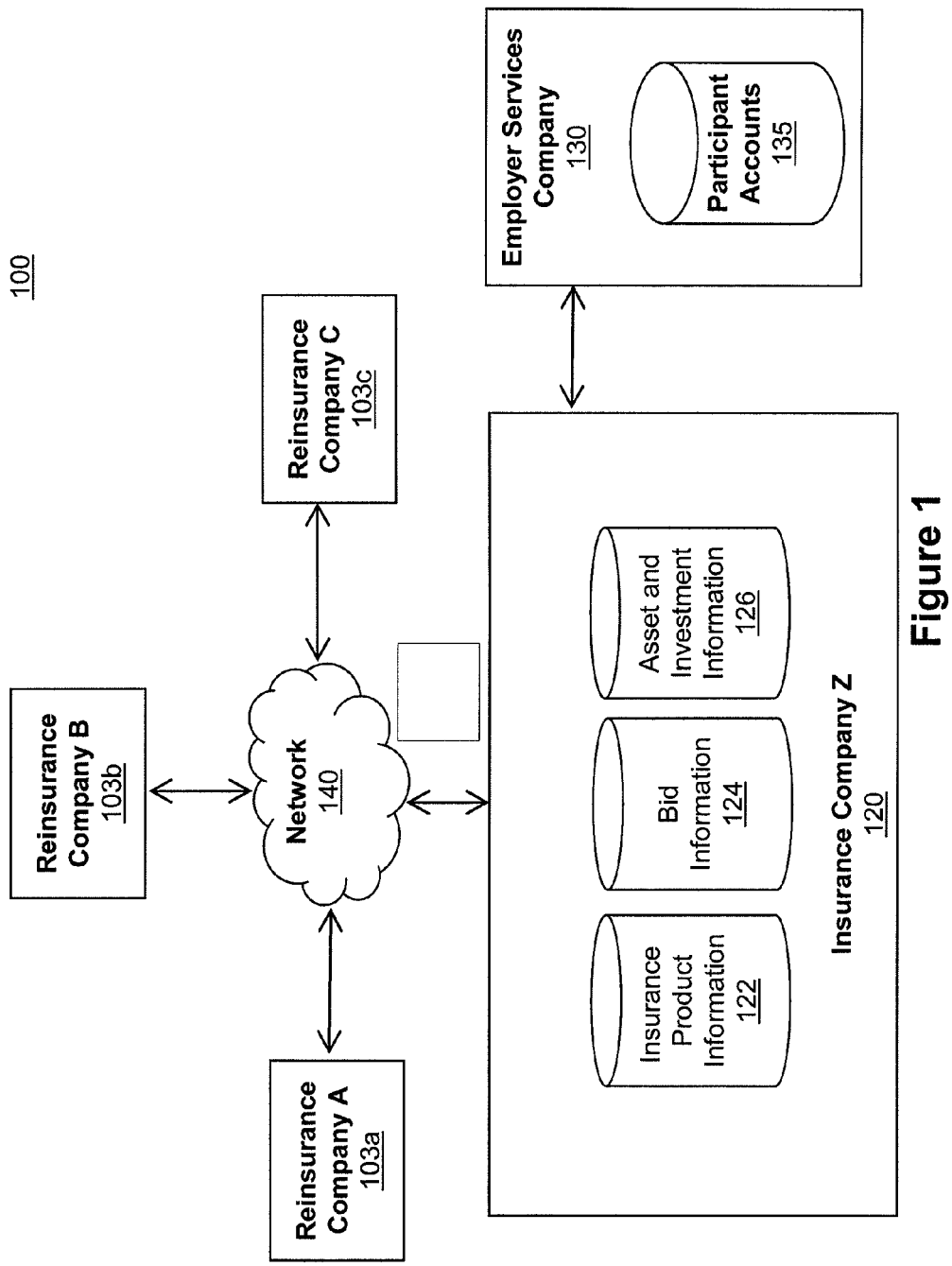
FIG. 1 is a block diagram illustrating an exemplary system for managing an insurance product.

FIG. 1 is a block diagram illustrating an exemplary system 100 for managing an insurance product. The system 100 includes a computing device associated with a reinsurance company A 103a, a computing device associated with a reinsurance company B 103b, a computing device associated with a reinsurance company C 103c, a computing device associated with an insurance company Z 120, and a computing device associated with an employer services company 130. The computing device associated with the insurance company Z 120 includes storage modules for storing and/or maintaining insurance product information 122, bid information 124, and asset and investment information 126. If a third party insurance company (e.g., insurance company Z 120) maintains the records for the insurance products, this advantageously increases the simplicity associated with the insurance products for the clearing house and/or plan sponsor.

The computing device associated with the employer services company 130 includes a storage module for maintaining participant accounts 135. The computing device associated with the insurance company Z 120 communicates with the computing device associated with the reinsurance company A 103a, the computing device associated with the reinsurance company B 103b, and the computing device associated with the reinsurance company C 103c (generally 103) through a communications network 140. The computing device associated with the insurance company Z 120 communicates with the computing device associated with the employer services company 130.

An insurance plan (e.g., offered through a 401K plan) includes, for example, one or more insurance products (e.g., annuities paying at different ages). Each insurance product can be, for example, associated with a set of one or more risk factors (e.g., current age of purchaser). Each insurance product includes, for example, one or more units. A unit can be based on a convenient way to price the insurance product, which can correspond with a risk factor. For example, a unit can be associated with the current age or age range of the purchaser (e.g., 45 years old, or between 40-50 years old). Each unit can be associated with a price (e.g., a unit of insurance product alpha was priced at $45.00 a unit in December 2005) and/or an insurance company associated with the unit.

Although FIG. 1 illustrates three reinsurance companies A 103*a*, B 103*b*, and C 103*c*, any number of computing devices associated with any number of reinsurance companies (e.g., four, twenty, one hundred) can be connected to the network 140 (e.g., wide area network (WAN), private internet protocol (IP) network) for communication with the computing device of the insurance company Z 120. Similarly, although FIG. 1 illustrates one insurance company Z 120, a plurality of computing devices associated with a plurality of insurance companies (e.g., two, four, twenty, two hundred) can be connected to the network 140 for communication with the computing device of the reinsurance companies (e.g., A 103*a*).

In some examples, the computing devices of the reinsurance companies 103 communicate with the computing device of the insurance company Z 120 to create and administer an insurance plan. The insurance plan includes, for example, one or more insurance products that are selected based on a relationship of the bid of units of the insurance products received from the insurance companies 103. The relationship of the bids can be, for example, the lowest bid, the best bid (e.g., bid associated with the reinsurance company with highest rating category and lowest bid in the category, bid associated with the highest average return), and/or any other relationship between bids.

The computing device of the insurance company Z 120 stores and/or maintains insurance product information 122. The insurance product information 122 includes benefit information, payment information, asset information, liability information, reserve asset information, and/or other information associated with the insurance product. The storage and/or maintenance of insurance product information 122 by a third party insurance company advantageously allows for the information to be maintained and/or verified by a party separate from and different than the party reinsuring the insurance product.

The computing device of the insurance company Z 120 stores and/or maintains bid information 124. The bid information 124 includes insurance product identification information, risk factor information (e.g., identification of the set of one or more risk factors associated with the bid), price per unit, and/or other information associated with bids for insurance products. The bid information 124 includes, for example, information for each bid. The bid information includes, for example, a set of risk factors (e.g., age, age and health, age and profession), a price, and/or a company. In some examples, the price includes the price of a unit of an insurance product for each set of one or more risk factors. The price of a unit of an insurance product fluctuates, for example, based on the set of one or more risk factors. For example, the price of a unit of an insurance product increases with increasing age because there is less time for the insurance product to accrue funds.

The computing device of the insurance company Z 120 stores and/or maintains asset and investment information 126. The asset and investment information 126 includes purchase information (e.g., buy a particular asset for an insurance product), sell information (e.g., sell a particular asset for an insurance product), payment information (e.g., send annuity payment to an owner of the insurance product, payment for the management of an insurance product), and/or other information associated with the management of an insurance product. The asset and investment information 126 includes asset information, asset purchase information (e.g., when the asset was purchased, how much the asset was purchased for), and/or other information associated with the assets of an insurance product. In this embodiment, the asset information for each insurance product is advantageously maintained and/or verified by a party separate from the party making investment decisions for the insurance product.

In some examples, the participant can purchase one or more parts of the unit of the insurance product. For example, one unit of the insurance product costs $100.00 and the unit can be split into four parts. Each ¼ part of the unit costs $25.00. The participant can purchase one or more parts of the unit of the insurance product as part of the insurance plan. The participant can purchase a plurality of parts of the insurance product which total more than one unit (e.g., purchase five ¼ units of an insurance product for a total of 1¼ units of the insurance product, purchase ten ¼ units of an insurance product for a total of 2½ units of the insurance product). As a further example, the participant purchases two ¼ parts of the unit for a total cost of $50.00. The participant would receive a total of ½ of the benefit of the unit of the insurance product. For example, if the insurance product is an annuity that pays $100.00 per month after age sixty-five, then the participant receives $50.00 per month from the annuity after age sixty-five since the participant purchases two ¼ parts of the unit of the insurance product.

For example, a fixed annuity for thirty-five year old participants which pays at a specified rate of five dollars a month starting at a specified time of sixty-five years old can be managed for a retirement plan. The management of the fixed annuity includes the insurance company Z 120 receiving multiple bids for a price of a unit of the fixed annuity (in this example, set payments for life from the age of sixty-five for a thirty-five year old). A bid from reinsurance company A 103*a* is for forty dollars, a bid from reinsurance company B 103*b* is for fifty dollars, and a bid from reinsurance company C (103*e*) is for forty-five dollars. The insurance company Z 120 selects a lowest bid (in this example, forty dollars from insurance company A 103*a*) from the bids for the unit of the fixed annuity based on the relationships between the bids (in this example the lowest bid). The reinsurance company Z 120 offers one or more units of the fixed annuity associated with the lowest bid to one or more participants of the retirement plan which qualify based on risk factor of the age of thirty-five.

One or more participants that qualify to purchase units of the fixed annuity submit a request, typically through the employer services company 130 managing the retirement plan, to the insurance company Z 120 to purchase units of the fixed annuity. Participant AA submits a request to purchase thirty units of the fixed annuity at the price of forty dollars per unit. Insurance company Z 120 purchases assets to be used for eventual payout of the participant's purchase based on information sent by reinsurance company A 103*a*, since the reinsurance company A 103*a* had the lowest bid. Since participant A purchased thirty units of the fixed annuity at forty dollars, the assets of the fixed annuity increased by $1,200 (the purchase price of the thirty units). The bid from reinsurance company A 103*a* was based on using assets of Big Company's bonds. Based on the increase in the assets of the fixed annuity due to the participant's purchase of thirty units, reinsurance company A 103*a* and/or insurance company Z 120 calculates the number of bonds in Big Company to purchase. Since the bonds in Big Company were $12 a bond, this calculates to a purchase of one hundred bonds from Big Company. As another example, Big Company's stocks and/or any other type of security can be purchased based on the purchase of the fixed annuity.

In another example, one hundred units of a fixed annuity are purchased at $50.00 per unit. The total available funds to purchase first assets is $5,000.00 (100 times $50.00). The quantity of assets to be purchased is associated with the number of units, since the available funds are dependant on the number of units purchased. Based on the stock price of Company ABC's stock, $10.00 per share, five hundred shares of Company ABC's stock is purchased based on the number of units of the fixed annuity purchased by the participants. In some examples, a percentage of the available funds is withheld as reserve assets for the insurance product (e.g., 10% of all purchases is put into the reserve assets of the insurance product).

In some examples, the insurance company Z 120 manages the assets for the fixed annuity. The management of the assets can be, for example, based on investor advisor agreements with participating companies. The management of the assets is based on information received from the reinsurance companies associated with units in the fixed annuity. For example, a fixed annuity that pays $1,000.00 a month starting at the age of sixty includes units from five different reinsurance companies A 103a, B 103b, C 103c, D, and E. Each reinsurance company submits management information for the assets of the fixed annuity associated with the reinsurance companies' respective units of the fixed annuity. The management of the assets can be based, for example, on the percentage of the number of units associated with each company, the percentage of the value of the units associated with each company, and/or any other allocation of the management of the assets.

In other examples, the following month the insurance company Z 120 receives additional bids for a price of a unit of the fixed annuity. A bid from reinsurance company A 103a is for fifty dollars, a bid from reinsurance company B 103b is for forty dollars, and a bid from reinsurance company C 103c is for forty-five dollars. The lowest bid of forty dollars from reinsurance company B 103b is selected. Units of the fixed annuity are offered to participants who qualify to purchase the fixed annuity (in this example, thirty five years old participants).

Participant BB submits a request to purchase twenty units of the fixed annuity at the price of forty dollars. Insurance company Z 120 purchases ten shares of Little Company's stock based on purchase information sent by reinsurance company B 103b, since the reinsurance company B 103b had the lowest bid. Since participant BB purchased twenty units of the fixed annuity at forty dollars, the assets of the fixed annuity increased by $800 (the purchase price of the twenty units). Based on the increase in the assets of the fixed annuity, reinsurance company B 103b calculated the number of bonds from Little Company to purchase. Since the bonds from Little Company were $80 a bond, reinsurance company B 103b instructed insurance company Z 120 to purchase ten bonds from Little Company.

In some examples, the computing device associated with the insurance company Z 120 records the identification information of the bidders and/or the relationships between the bids (e.g., lowest bid, best bid) in the bid information storage module 124 for the risk factors. In other examples, the bidders pre-commits to accept the risk of an insurance product for a given set of risk factors. In some examples, the insurance company Z 120 communicates with the employer services company 130 through a communication network (not shown).

For example, if insurance company B 103b submits the lowest price bid for a unit of an fixed annuity for the age of twenty one with a payout of five hundred dollars a month at the age of sixty five, then the insurance company Z 120 records insurance company B's identification information (i.e., "B") and the bid information in the bid information storage module 124 (e.g., database).

In some examples, the reinsurance company 103 reinsures one or more of the insurance products offered under the insurance plan by the insurance company Z 120. For example, if the reinsurance company 103 sets a ratio of 75% for the reserve asset to liability asset (e.g., reserve assets of one million with liabilities of seven hundred and fifty thousand dollars), then the reinsurance company 103 can reject the insurance products that do not meet this ratio (e.g., reserve assets of one million dollars with liabilities of eight hundred thousand dollars). The reinsurance of the insurance products advantageously allows for the reduction of risk of the insurance products for the insurance company and the participants by providing a separate insurance policy on the insurance products. The reinsurance of the insurance products advantageously allows the third party insurance company (e.g., insurance company Z 120) to enhance its creditworthiness through the reinsurance of the insurance products from the reinsurance company 103.

In other examples, the reinsurance company 103 is compensated for reinsuring one or more of the insurance products. The compensation includes transmitting, for example, a payment (e.g., fifty dollars a month, ten percent of the value of the insured insurance products per year) for the reinsurance of the one or more insurance products.

In some examples, the request from the one or more participants for the purchase of one or more of the units of the fixed annuity includes a contribution from the one or more participants. The contribution from the one or more participants includes a payment of money for the purchase of the units of the insurance product (e.g., fixed annuity).

Although FIG. 1 illustrates three reinsurance companies 103, the computing device associated with the insurance company Z 120 can communicate with a plurality of reinsurance companies (i.e., the computing device associated with each reinsurance company). The plurality of reinsurance companies can have, for example, different standards, rules, and/or ratios for which insurance products to reinsure.

In other examples, the employer services company 130 provides human resources and benefits services to employees. The employer services company 130 maintains and/or stores information associated with the insurance plan associated with each participant. In some examples, the employer services company 130 is the employer of the participants. In other examples, the employer services company 130 is a third party provider of services to the employer of the participants. In some example, the employer services company 130 is a third party provider of retirement plans to participants and is not associated with the employers of the participants (e.g., manages a 401K plan on behalf of an employer).

Although FIG. 1 illustrates one computing device associated with the employer services company 130 communicating with the computing device associated with the insurance company Z 120, a plurality of computing devices associated with the plurality of the employer services companies can communicate with the computing device associated with the insurance company Z 120. The computing device associated with the insurance company Z 120 can communicate, for example, with the plurality of computing devices associated with the employer services companies to offer insurance plans to each of the employer services companies.

In other examples, insurance company Z 120 maintains minimum reinsurance rules for reinsurance companies (e.g., reinsurance company A 103a). For the reinsurance companies to submit bids in the bidding process for insurance products and/or to continue maintaining the insurance products, then the reinsurance companies have to, for example, maintain the requirements of the reinsurance rules. The minimum reinsurance rules can include, for example, an amount of managed assets, a certification (e.g., government certification, industry certification), a license (e.g., government license), a rating, and/or any other type of insurance requirement. If a reinsurance company does not satisfy the minimum reinsurance rules, the reinsurance company cannot submit bids for insurance products and/or management the assets associated with the insurance products.

In some examples, reinsurance companies (e.g., reinsurance company B 103*b*) no longer participate in the offering and/or managing of the insurance products. For example, reinsurance company A 103*a* does not participate in the offering and managing of the insurance products. Reinsurance company A 103*a* transfers all of its rights and obligations for the insurance products to Reinsurance company B 103*b*. In other examples, reinsurance company A 103*a* splits its rights and obligations for the insurance products among a plurality of reinsurance companies (e.g., ½ to reinsurance company C 103*c* and ½ to reinsurance company D (now shown)).

Figure 2:
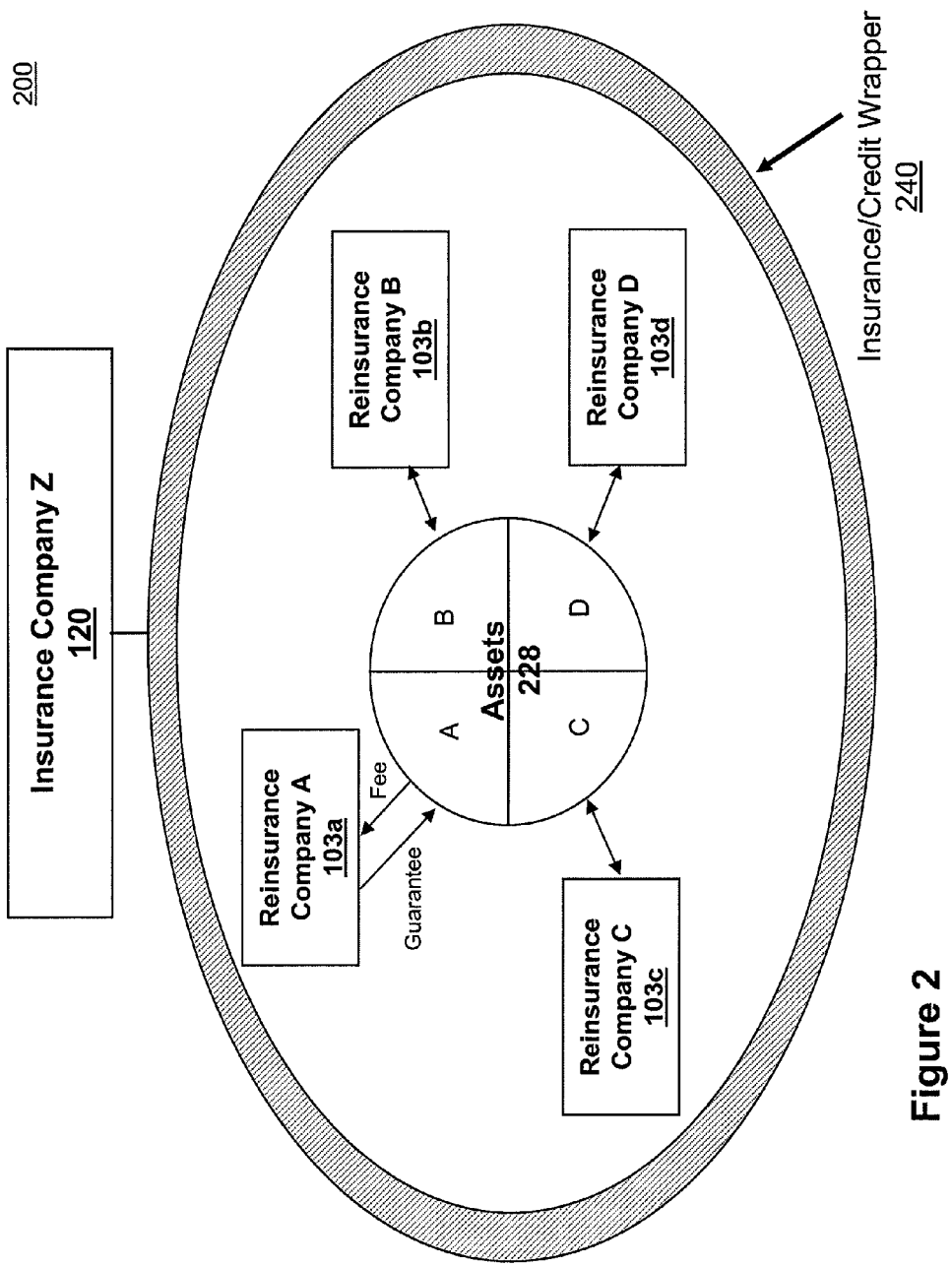
FIG. 2 is a block diagram illustrating an exemplary system for managing an insurance product with insurance company Z.

FIG. 2 is a block diagram illustrating an exemplary system 200 for managing an insurance product with insurance company Z 120. The system 200 includes the insurance company Z 120, the reinsurance companies 103, assets 228, and an insurance/credit wrapper 240. Each reinsurance company (e.g., A 103*a*) manages their part of the assets in the set of assets 228 and/or provides a guarantee for their part of the assets 28. For example, reinsurance company A 103*a* provides a guarantee for their assets A and in return receives a fee for the guarantee. In addition, reinsurance company A 103*a* provides the management information for the assets and in return receives a fee for the management information. The reporting and/or ownership obligations for the assets 228 from each reinsurance company 103 are to the insurance company Z 120.

In addition to the reinsurance companies 103 providing a guarantee for the assets, an insurance and/or credit wrapper 240 can utilized for the assets 128. The insurance and/or credit wrapper 240 (e.g., insurance policy, security deposit) can provide a risk mitigation strategy in case a reinsurance company 103 defaults on its obligations regarding the assets 228. An advantage of the insurance and/or credit wrapper is that the assets receive an extra layer of protection beyond just the guarantees by the reinsurance companies.

Figure 3:
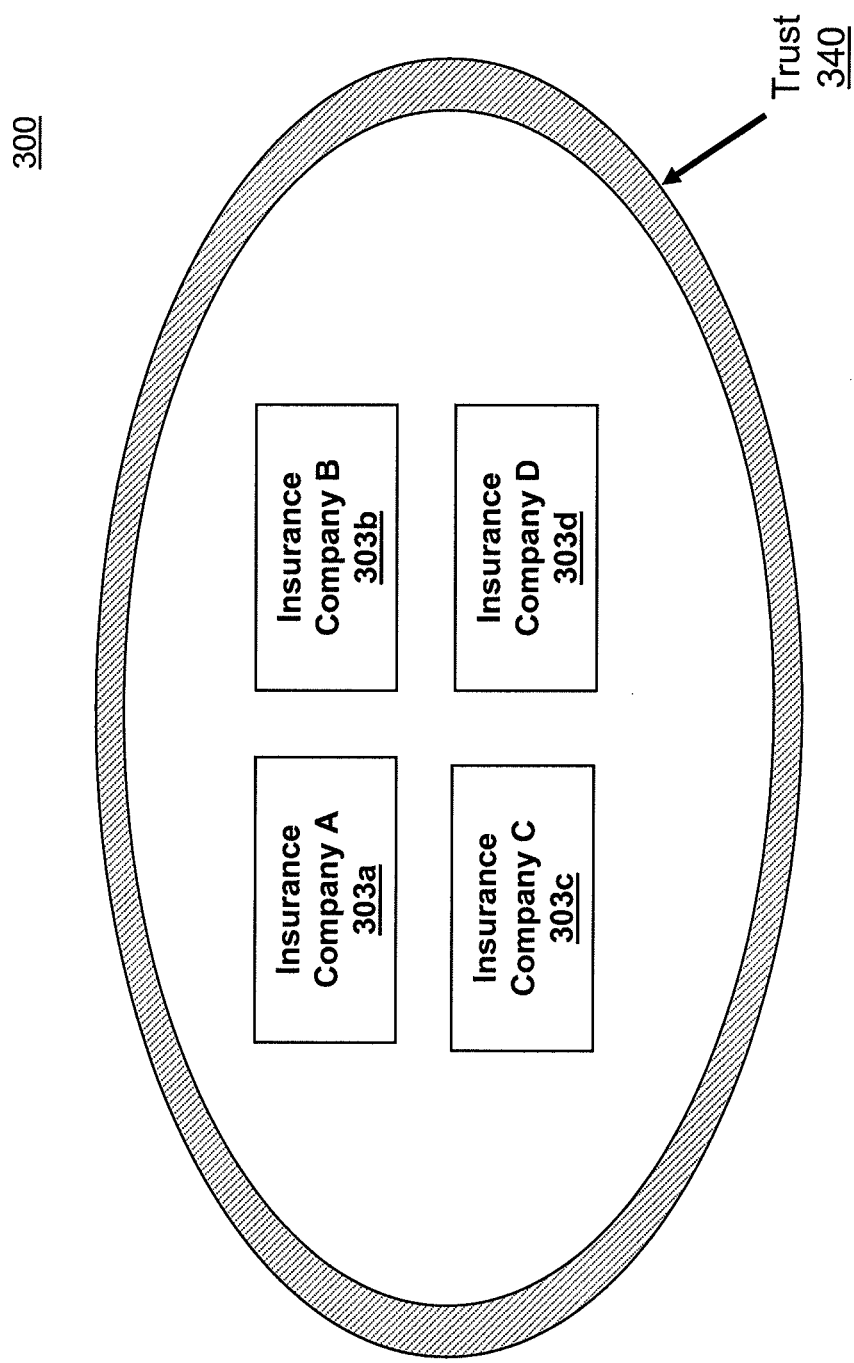
FIG. 3 is a block diagram illustrating an exemplary system for managing an insurance product in a trust.

FIG. 3 is a block diagram illustrating an exemplary system 300 for managing an insurance product in a trust 340. The system 300 includes the insurance companies A 303*a*, B 303*b*, C 303*c*, and D 303*d* (generally 303) and the trust 340. The insurance companies interact with the trust 340 for the bidding process. In this example, the trust 340 does not manage the assets (not shown), but the management of the assets remains with each insurance company 303. The obligations for the assets would go the plan participants who purchased the insurance products (i.e., not to a third party insurance company (e.g., insurance company Z)). In other words, the trust 340 offers the insurance products and facilities the bidding process to obtain bids for each insurance product as described herein. Units from the selected insurance product are offered to participants, but the assets and/or the management of purchased insurance products are with the respective insurance company 303 which sold the insurance products.

In other examples, the insurance company 303 submits income payments to each of the participants associated with the units that the insurance company 303 sold. The insurance company 303 can purchase assets based on the purchase of the units of the insurance product. The assets remain, for example, with the purchasing insurance 303 company for management. The purchasing insurance 303 company manages the assets. In some examples, the trust 340 maintains and/or purchases a credit default swap to insure against the default of a insurance company 303. Although FIG. 3 illustrates insurance companies 303, the insurance companies 303 can be, for example, engaged in reinsurance of other insurance companies' products (e.g., as a reinsurance company 103).

Figure 4:
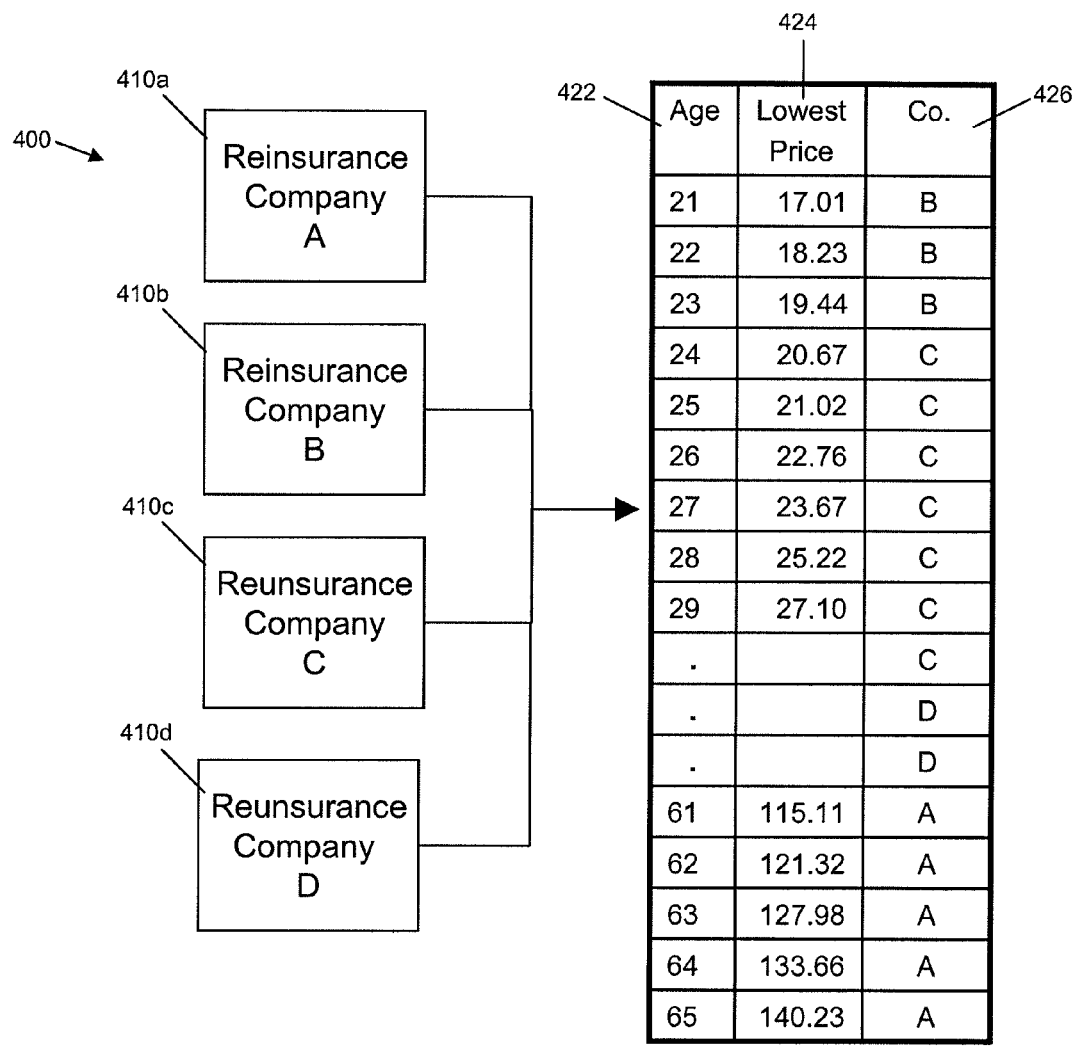
FIG. 4 is a diagram illustrating the offering of an insurance plan.

FIG. 4 is a diagram 400 illustrating the offering of an insurance plan. The offering of the insurance plan includes receiving multiple bids for an insurance product from multiple reinsurance companies A 410*a*, B 410*b*, C 410*c*, and D 410*d* (generally 410). Information associated with the offering includes a set of one or more risk factors 422 (for this example, age), a lowest price 424 for a unit of the insurance product for each set of one or more risk factors, and the reinsurance company 426 associated with the lowest price. For example, for the set of risk factors that includes individuals who are twenty-one years old for a fixed annuity that pays ten dollars a month starting at the age of forty five, the lowest price is $17.01 from insurance company B 410*b*.

In other examples, multiple bids are received for each set of risk factors and the lowest price is selected for each set of risk factors. For example, for individuals who are twenty-seven years old (i.e., risk factors), bids are received from the reinsurance companies A 410*a*, B 410*b*, and C 410*c*. The bids for the age of twenty-seven include: $25.53 from reinsurance company A 410*a*; $24.54 from reinsurance company B 410*b*; and $23.67 from insurance company C 410*c*. The lowest bid of $23.67 from reinsurance company C 410*c* is selected from the bids for the insurance product for the age of twenty-seven.

In other examples, the relationships between the bids are determined to select a bid. The selected bid can be, for example, the lowest bid and/or the best bid in a category. For example, reinsurance company B 410*b* and reinsurance company A 410*a* have five star ratings and reinsurance company C 410*c* has a two star rating. The bids are weighed based on the ratings of the reinsurance companies 410. Even though reinsurance company C 410*c* has a lower bid price than reinsurance company B 410*b*, reinsurance company B 410*b* has the best bid because of the combination of the rating and price.

In some examples, the plurality of bids for the insurance product from the plurality of reinsurance companies 410 can be received as an annual, biannual, quarterly, monthly, bimonthly, weekly, and/or daily payment price. Although FIG. 4 illustrates prices from a common payment timeframe (e.g., monthly), the bids can be, for example, for different payment timeframes (e.g., monthly and quarterly, quarterly and yearly). Bids that are for different payment timeframes can be, for example, converted to the least common payment timeframe.

Although FIG. 4 illustrates one age for each entry in the table, a range or ages can be associated with each entry in the table. For example, the age range 20-22 can have a lowest price of $15.02 from insurance company C 410*c*.

For example, the following three bids are received for a set of one or more risk factors: $36.00 biannual payment from reinsurance company A 410*a*; $144.00 yearly payment from reinsurance company B 410*b*; and $10.00 monthly payment from reinsurance company C 210*c*. The three bids are converted to the least common payment timeframe (in this example, monthly payment is the least common payment timeframe). The three bids in a monthly timeframe are: $6.00 from reinsurance company A 410*a*; $12.00 from reinsurance company B 410*b*; and $10.00 from reinsurance company C 410*c*.

The payment conversion can include, for example, a valuation of the future cost of purchasing the insurance product via the different payment timeframes. For example, although the annual timeframe payment from reinsurance company A 410a has the lowest monthly cost, the cost of paying the annual payment upfront is factored into the cost calculation. The three bids are converted to the least common payment timeframe (in this example, monthly payment is the least common payment timeframe) adding in a factor for the future costs of payments from different timeframes. For example, the three bids in a monthly timeframe with the future cost are: $6.60 from reinsurance company A 410a (monthly costs plus cost to pay the biannual premium); $12.12 from reinsurance company B 410b (monthly costs plus cost to pay the annual premium); and $10.00 from reinsurance company C 410c.

Figure 5:
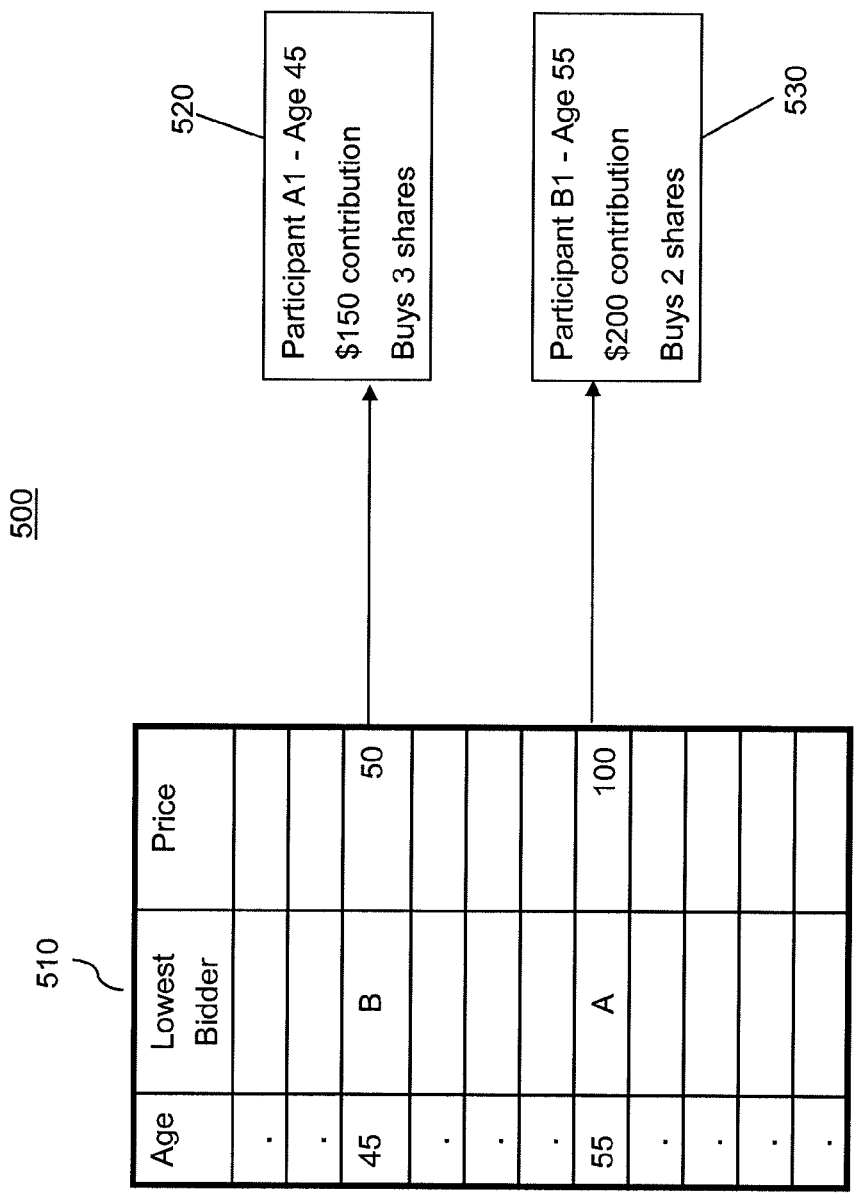
FIG. 5 is a diagram illustrating the offering of an insurance plan.

FIG. 5 is a diagram 500 illustrating offering an insurance plan. The offering of the insurance plan includes offering an insurance product. The insurance product is offered at a price of a lowest bid per unit of the insurance product. The table 510 illustrates an insurance product offered for different sets of risk factors (in this example, age) and the lowest bidder and price for the insurance products.

For example, a request is received from Participant A1 520 for the purchase of three units (in this example, shares). The lowest bid for a price of one unit of the reinsurance product for Participant A1's set of risk factors (in this example, age 45) is from Reinsurance Company B for a price of $50.00 per unit. The purchase of three units of this insurance product requires a contribution of $150.00 from Participant A1. Participant A1 520 contributes $150.00 to the assets associated with the insurance product. The assets (e.g., purchased investments, retained reserve assets) and liabilities (e.g., future payments) associated with this insurance product are updated based on the purchase of the three units of the insurance product by Participant A1.

For example, a request is received from Participant B1 530 for the purchase of two units (in this example, shares). The lowest bid for a price of one unit of the insurance product for Participant B1's set of risk factors (in this example, age 55) is from Reinsurance Company A for a price of $100.00 per unit. The purchase of two units of this insurance product requires a contribution of $200.00 from Participant B1. Participant B1 530 contributes $200.00 to the assets associated with the insurance product. The assets and liabilities associated with this insurance product are updated based on the purchase of the two units of the insurance product by Participant B1.

In other examples, the contributions are from the Participants (e.g., Participant A1, Participant B1). In some examples, the contributions can be partially or fully funded from an employer (e.g., Participant A1's employer contributes $200 per month), an employer match (e.g., Participant A1 contributes $200 and Participant A1's employer contributes $200), profit sharing, and/or any other employer contribution program. In other examples, the contribution can be associated with a retirement plan (e.g., employee pension plan, 401(k) plan, IRA plan). For example, Participant A2 purchases two units of a fixed annuity that pays ten dollars a month starting at the age of sixty-five. The two units of the fixed annuity cost $100 per unit which is the lowest bid. Participant A2's employer contributes 50% of the purchase price, $100, and Participant A2 contributes the remaining amount, $100, to purchase the units of the fixed annuity.

In some examples, information associated with each participant is updated based on the request for the purchase of units of an insurance product. The information can be stored and/or maintained, for example, in the participant account storage module 135 at the employer service company 130 of FIG. 1. The participant account information includes, for example, participant contact information (e.g., phone number, mailing address, email address), account login information (e.g., login, password), participant personal information (e.g., social security number, next of kin, beneficiaries), insurance product purchase information (e.g., how many units of any insurance product, time of purchase, price at purchase), insurance product names, reinsurance company names, and/or other information associated with a participant account.

In other examples, the request for the purchase of units of an insurance product is communicated from the participant to the employer services company 130 of FIG. 1 via an automated telephone purchase system. For example, the participant dials a telephone number, enters in his account information and passcode, and enters in the insurance product for purchase and the number of units to purchase. The interaction between the participant and the telephone purchase system can include, for example, a voice response system (e.g., conversion from voice request to non-voice request) and/or a number input system (e.g., enter in a code for an insurance product).

In some examples, the request for the purchase of units of an insurance product is communicated from the participant to the employer services company 130 via a representative of the employer services company 130. The representative of the employer services company 130 can be, for example, an employee or an independent contractor of the employer services company 130. The participant can communicate, for example, with the representative via facsimile, letter, telephone call, and/or in person (e.g., face to face meeting).

In other examples, the request for the purchase of units of an insurance product is communicated from the participant to the employer services company 130 via an employer services company website. The website can be, for example, a secure website to ensure that the communication between the participant and the employer services company 130 is not monitored by third parties. For example, the participant utilizing a web browser goes to the employer services company 130 website, logs into the website using his account information and passcode, and enters in the insurance product for purchase and the number of units to purchase.

In some examples, the updating of the assets and liabilities of the insurance product includes purchasing additional assets for the insurance product. The assets include ownership and/or trustee interests in, for example, a stock, a bond, a mutual fund, a share in a company, and/or any other type of investment.

In other examples, the updating of the assets and liabilities of the insurance product includes calculating the potential payments associated with the insurance product. The potential payments include, for example, the present day value of the future payments. The future payments and/or the liabilities can be calculated, for example, based on life expectancy of the participants associated with the insurance product.

Figure 6:
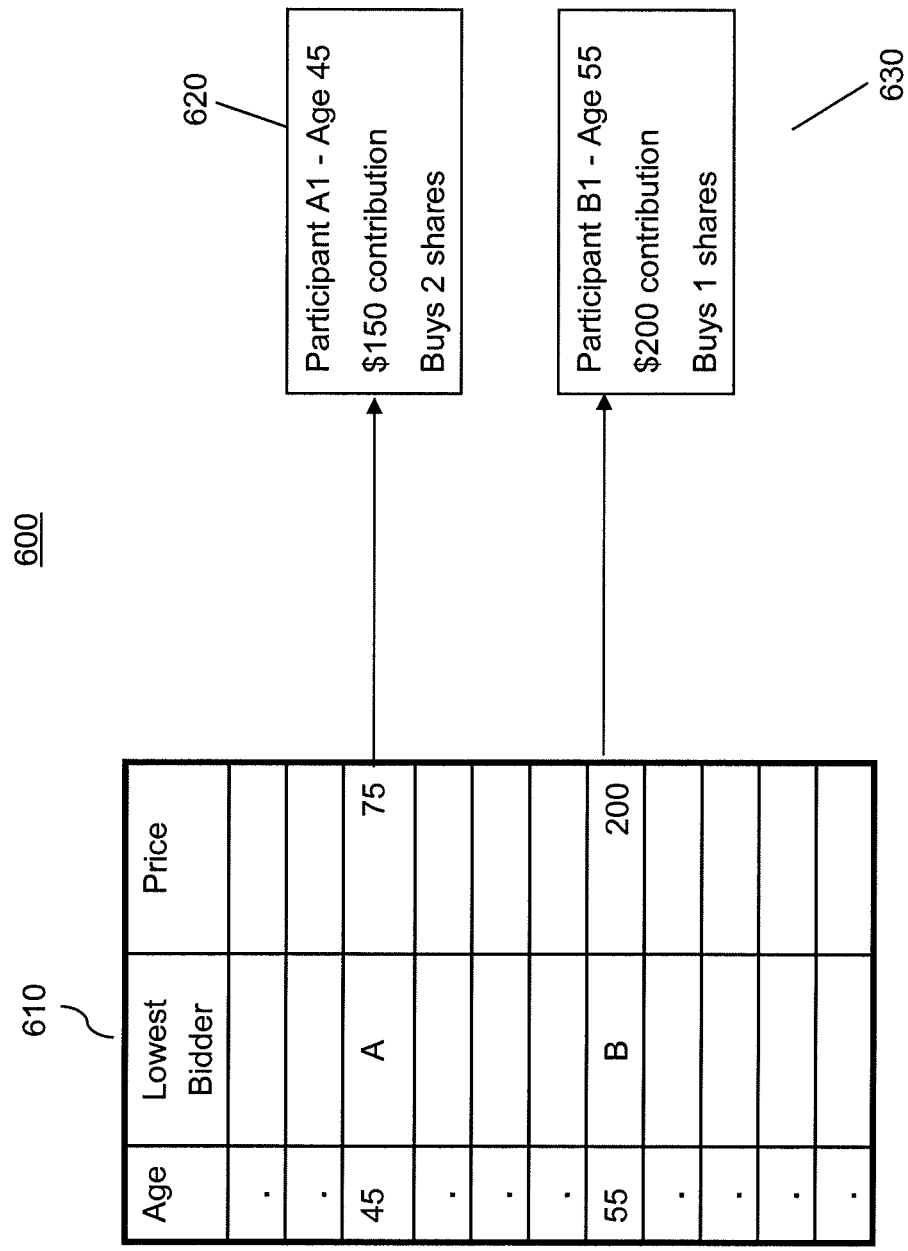
FIG. 6 is a diagram illustrating the offering of an insurance plan.

FIG. 6 is a diagram 600 illustrating another example of the offering of an insurance plan. The insurance product is offered at a price of a lowest bid per unit of the insurance product. The table 610 illustrates the insurance product offered for different risk factors (in this example, age), the lowest bidder, and the lowest price for the insurance product. The diagram 600 illustrates requests for the purchase of units of insurance products by Participant A1 620 and Participant B1 630.

Although FIG. 6 illustrates the lowest bid, a bid can be, for example, determined based on relationships between the bids. Information about each reinsurance company can be, for example, utilized to weigh the bids to determine a bid for the insurance product.

In some examples, FIG. 5 illustrates the purchase of units by Participant A1 and Participant B1 in a first month (e.g., March) and FIG. 6 illustrates the purchase of units by Participant A1 and Participant B1 in a second month (e.g., April). Although FIGS. 5 and 6 illustrate the purchase of units in a two month period, a participant can purchase a plurality of units in a plurality of months. For example, a participant can purchase five units in August, four units in October, and ten units in December.

For example, during the first month, a request is received from Participant A1 320 of FIG. 5 for the purchase of three units. The lowest bid for a price of one unit of the insurance product for Participant A1's set of risk factors (in this example, age 45) is from Reinsurance Company B for a price of $50.00 per unit. The purchase of three units of this insurance product requires a contribution of $150.00 from Participant A1. Participant A1 520 contributes $150.00 to the assets associated with the insurance product. The assets and liabilities associated with this insurance product are updated based on the purchase of the three units of the insurance product by Participant A1.

During the second month, a request is received from Participant A1 620 for the purchase of two units. The lowest bid for a price of one unit of the insurance product for Participant A1's set of risk factors (in this example, age 45) is from Reinsurance Company A for a price of $75.00 per unit. The purchase of two units of this insurance product requires a contribution of $150.00 from Participant A1. Participant A1 620 contributes $150.00 to the assets associated with the insurance product. The assets and liabilities associated with this insurance product are updated based on the purchase of the three units of the insurance product by Participant A1. Another advantage is that the participant can purchase units of an insurance product at prevailing rates over a period of time.

After the purchase of the two units during the second month, Participant A1 owns five units of this insurance product associated with the set of risk factors (in this example, age 45). In some examples, the five units of this insurance product are valued at $375.00 (5 times $75.00). This valuation of $375.00 reflects the lowest price of the units of the insurance product. In other examples, the five units of this insurance product are valued at $390.00 (2 times $75.00 (the cost of one unit of the insurance product from insurance company A) plus 3 times $80.00 (the cost of one unit of the insurance product from insurance company B)). This valuation of $390.00 reflects the most recent price for the units of the insurance product from reinsurance company A and the most recent price for the units of the insurance product from reinsurance company B.

For example, during the first month, a request is received from Participant B1 530 of FIG. 5 for the purchase of two units. The lowest bid for a price of one unit of the insurance product for Participant B1's set of risk factors (in this example, age 55) is from Reinsurance Company A for a price of $100.00 per unit. The purchase of two units of this insurance product requires a contribution of $200.00 from Participant B1. Participant B1 530 contributes $200.00 to the assets associated with the insurance product. The assets and liabilities associated with this insurance product are updated based on the purchase of the two units of the insurance product by Participant B1. An additional advantage is that the third party insurance company (e.g., insurance company Z 120) can offer units of insurance products at the most competitive rate from a group of highly rated insurance carriers.

During the second month, a request is received from Participant B1 630 for the purchase of one unit. The lowest bid for a price of one unit of the insurance product for Participant B1's set of risk factors (in this example, age 55) is from Insurance Company B for a price of $200.00 per unit. The purchase of one unit of this insurance product requires a contribution of $200.00 from Participant B1. Participant B1 630 contributes $200.00 to the assets associated with the insurance product. The assets and liabilities associated with this insurance product are updated based on the purchase of the one unit of the insurance product by Participant B1.

After the purchase of the one unit during the second month, Participant B1 owns three units of this insurance product associated with the risk factor (in this example, age 55). In some examples, the three units of this insurance product are valued at $600.00 (3 times $200.00). This price of $200 reflects the most recent price of this unit at the lowest bid. In other examples, the three units of this insurance product are valued at $700.00 (1 times $200.00 (the cost of one unit of the insurance product from insurance company B) plus 2 times $250.00 (the cost of one unit of the insurance product from insurance company A at the time of the valuation of the unit)). This valuation of $700.00 reflects the most recent price for the units of the insurance product from reinsurance company B and the most recent price for the units of the insurance product from reinsurance company A.

Participant B1 owns three units of the insurance product for Participant B1's risk factor (in this example, age 55) and manages her units of the insurance product based on the information that she owns three units of the insurance product (e.g., whether to buy more units, how much her annuity income will be at age 65). However, insurance company Z 120 manages participant B1's units as the units are allocated among the insurance companies (e.g., insurance company A 103a and insurance company B 103b). Insurance company Z 120 manages participant's B1's units as two units from insurance company A 103a and one share from reinsurance company B 103b. The transparency of the allocation of the units to different reinsurance companies from the participant's perspective (i.e., the participant does not view the allocation of the units with respect to different reinsurance companies) advantageously reduces the administrative burden on the participant while still allowing the third party insurance company (e.g., insurance company Z 120) to independently manage the units.

In some examples, a participant has an automatic plan that automatically purchases units of an insurance product. The automatic plan can be configured, for example, to purchase units of the insurance product on a periodic timeframe (e.g., predefined time interval, weekly, monthly, quarterly, yearly, a pay period), which advantageously provides for purchase of the insurance product at the lowest price per unit for the risk factors associated with the participant. For example, Participant BB has an automatic plan to buy one hundred dollars worth of units of a fixed annuity every month. The applicable units of the fixed annuity (e.g., those associated with the purchaser's age) that are the lowest price are automatically purchased for Participant BB every month.

Figure 7:
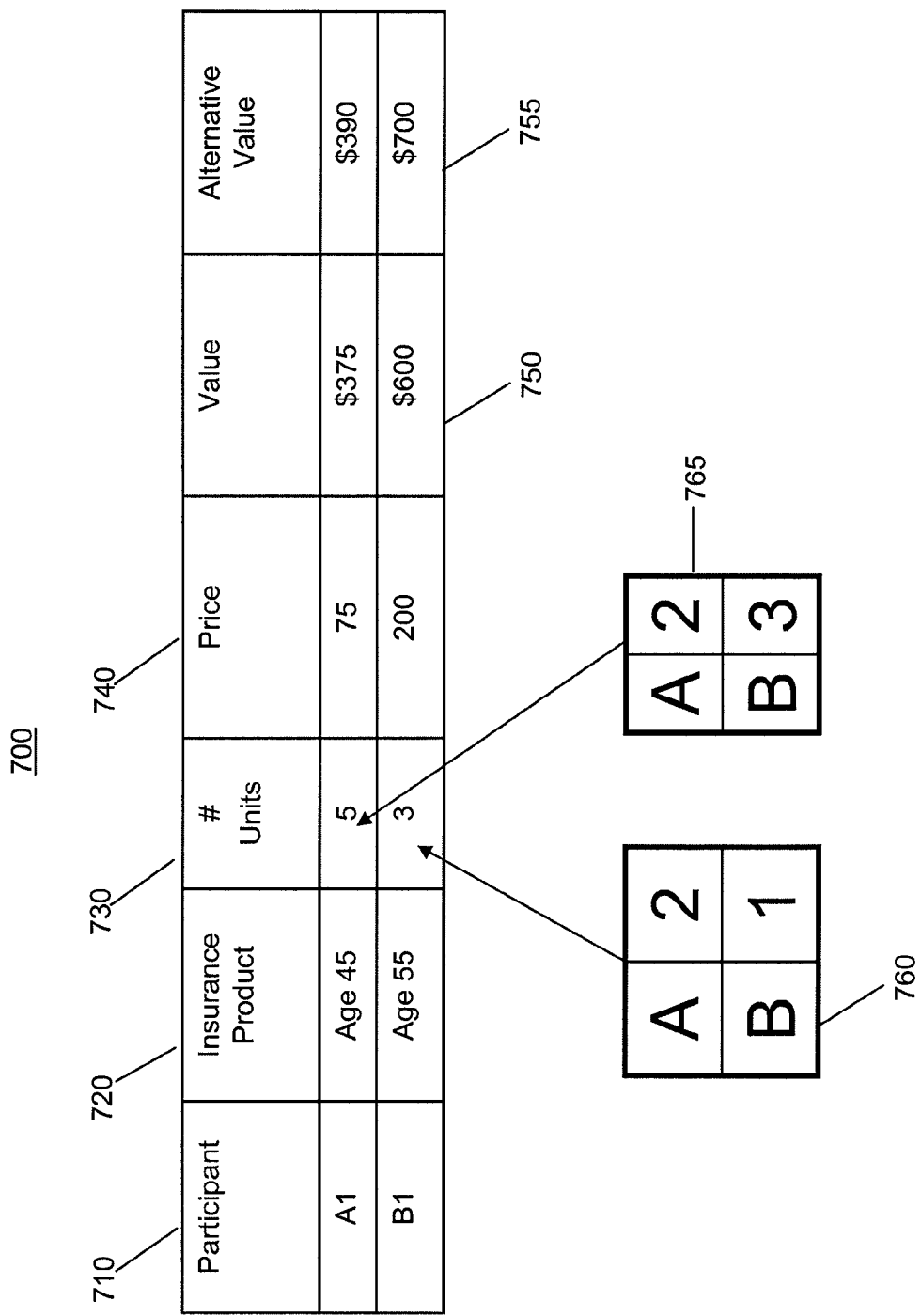
FIG. 7 is a diagram illustrating an insurance plan with two insurance products.

FIG. 7 is a diagram 700 illustrating an insurance plan with two insurance products. The diagram illustrates information that is stored in the participants accounts storage module 135 in the computing device associated with the employer services company 130 of FIG. 1. The information includes participants 710, insurance products 720, number of units 730, price 740, value of the insurance product for the participant 750, company type, and an alternative value of the insurance product for the participant 755. The information further includes information indicating the reinsurance companies associated with the units for each participant 510.

Participant A1 owns five units of the age 45 insurance product. For Participant A1, two of the units are associated with reinsurance company A and three of the units are associated with reinsurance company B. Participant B1 owns three units of the age 55 insurance product. For Participant B1, two of the units are associated with reinsurance company A and one of the units is associated with reinsurance company B. An advantage is that multiple reinsurance companies provide multiple rates because a single company does not always provide a competitive rate.

In other examples, the information associated with each of the one or more participants includes accumulated units purchased, a current value of the units purchased, and/or a future income value of the units purchased (e.g., $400 per month for life after sixty years old).

Figure 8A:
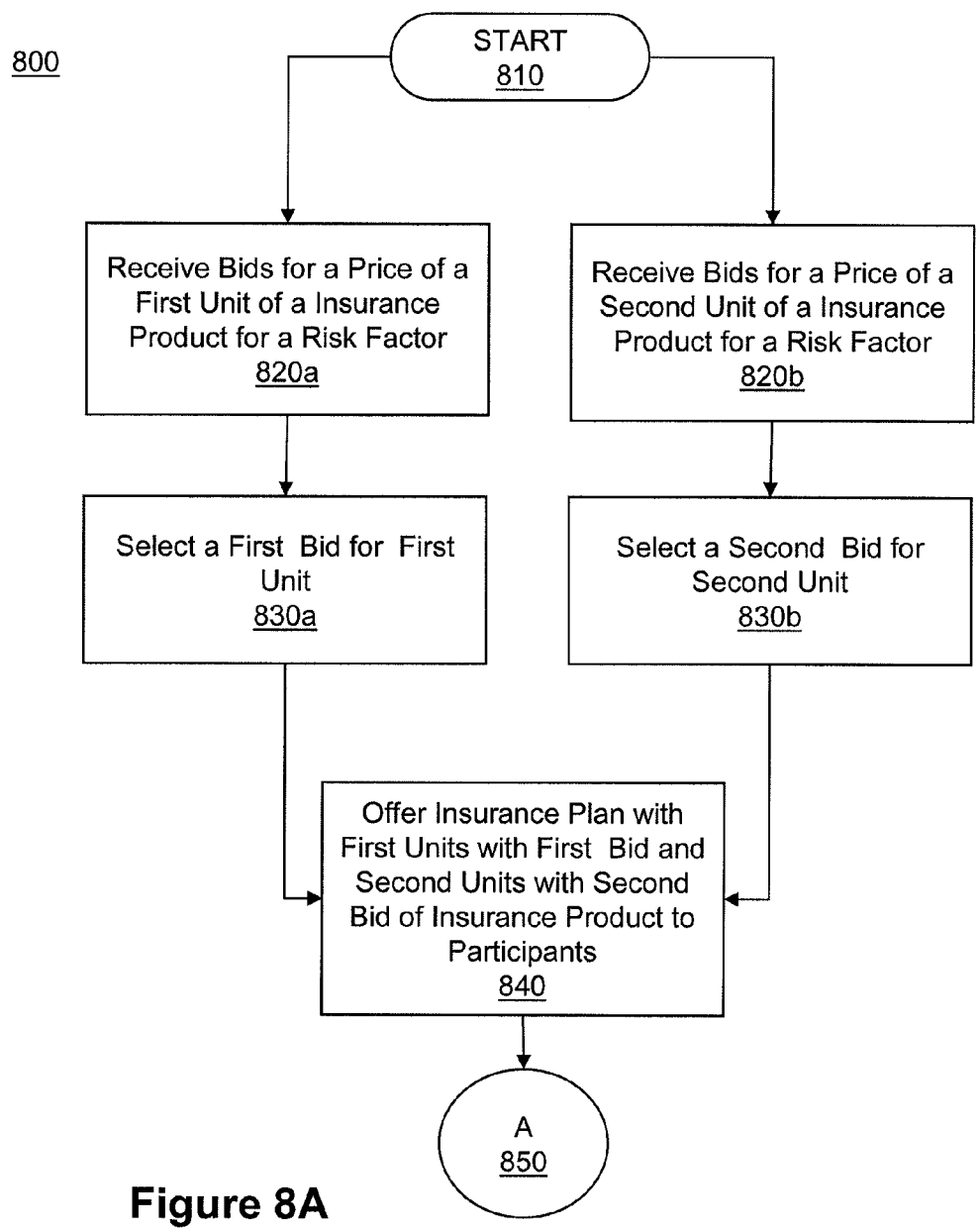
FIG. 8A is an exemplary flowchart illustrating the offering of an insurance plan.
Figure 8B:
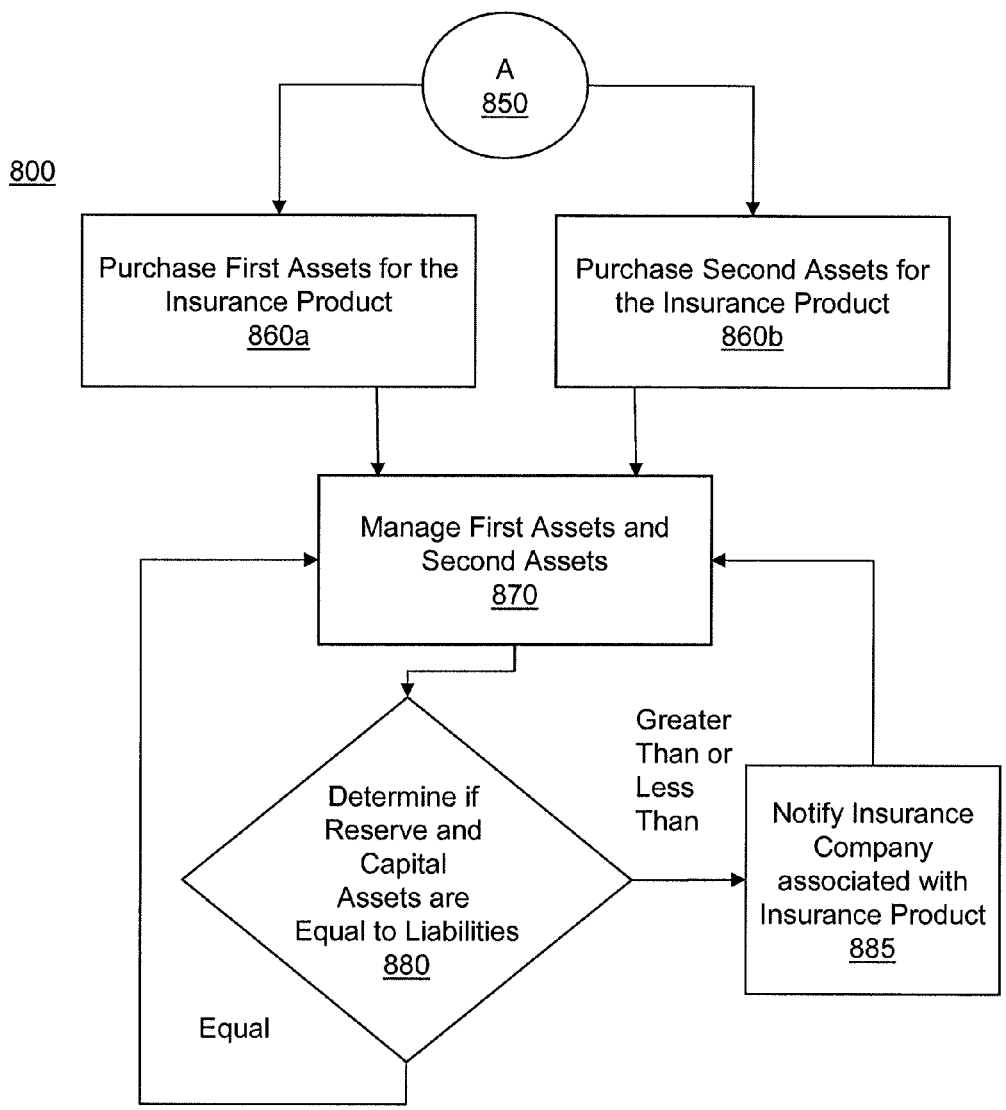
FIG. 8B is an exemplary flowchart illustrating the management of insurance products.

FIGS. 8A and 8B show an exemplary flowchart 800 illustrating the offering and management of an insurance plan through the exemplary system 100 of FIG. 1. The flowchart 800 starts (810) from the point of view of the insurance company Z 120. The insurance company Z 120 receives (820a) a first plurality of bids for a price of a first unit of an insurance product for a set of one or more risk factors. The first plurality of bids are received (820a) from a plurality of reinsurance companies (e.g., reinsurance company A 103a, reinsurance company B 103b). The insurance company Z 120 selects (630a) a lowest bid for the first unit. The insurance company Z 120 receives (820b) a second plurality of bids for a price of a second unit of the insurance product for the set of one or more risk factors. The second plurality of bids are received (820b) from a plurality of reinsurance companies (e.g., reinsurance company A 103a, reinsurance company B 103b). The insurance company Z 120 selects (830b) a lowest bid for the second unit. An advantage is that a third party insurance company provides a competitive bidding environment for the insurance products which decreases the costs associated with the insurance products.

The insurance company Z 120 offers (840) the insurance plan to participants. The insurance plan includes at least one first unit of the insurance product associated with the lowest bid for the first unit and at least one second unit of the insurance product associated with the lowest bid for the second unit. The participants that qualify based on the risk factor are offered (840) the insurance plan. The flowchart 800 is continued (850) from FIG. 6A to FIG. 6B.

The insurance company Z 120 purchases (860a) first assets for the insurance product based on information received from a first reinsurance company. The first reinsurance company is associated with the lowest bid for the first units of the insurance product. The insurance company Z 120 purchases (860b) second assets for the insurance product based on information received from a second insurance company. The second insurance company is associated with the lowest bid for the second units of the insurance product.

The insurance company Z 120 manages (870) the first assets and the second assets. The management (870) of the first assets is based on information received from the first reinsurance company. The management (870) of the second assets is based on information received from the second reinsurance company.

For each set of units of each insurance product, the insurance company Z 120 determines (880) if reserve and capital assets are greater then liabilities. If reserve assets are equal to liabilities, then the management (870) of the assets continues. If the reserve assets are greater than or less than liabilities, then the insurance company Z 120 notifies (885) the reinsurance company associated with the management of the insurance product and/or units of the insurance product and a true up of the assets occurs (e.g., occurs periodically). An advantage is that an employer and/or employee services company can have a higher degree of confidence of the safety of the insurance product since a third party is supervising the assets and liabilities of the insurance product. An additional advantage is that a third party insurance company mitigates the risks associated with the insurance products which increases the reliability associated with the insurance products through additional segregation of risks.

In some examples, the participant communicates a request to sell units of an insurance product associated with a set of one or more risk factors. The request to sell units of an insurance product can utilize, for example, the same pricing as the purchase price and/or competitive bidding for the highest selling price. For example, a participant with thirty units of age sixty deferred annuity insurance product communicates a request to sell the thirty units. The insurance company Z 120 determines that the purchase price was ten dollars a unit. The insurance company Z 120 sells the assets associated with this insurance product and sends the payment for the thirty units of this insurance product to the participant. For example, a participant with twenty units of age sixty deferred annuity insurance product communicates a request to sell the twenty units. The insurance company Z 120 requests bids for this insurance product and selects the highest bid for the price of one unit of the insurance product. The insurance company Z 120 sells the assets associated with this insurance product and sends the payment for the twenty units of this insurance product to the participant.

Although FIG. 8A illustrates the receiving (820a and 820b) of the bids and the selecting (830a and 830b) of the lowest bids occurring in or near parallel, the receiving of the bids and the selecting of the lowest bids can occur, for example, independently from each other (e.g., at different times). For example, the first units can be offered, for example, as part of the insurance plan and then at a later time (e.g., next hour, next day, next week), the second units can be added, for example, to the insurance plan.

Although FIG. 8B illustrates the purchasing (860a and 860b) of the first assets and the second assets occurring in or near parallel, the purchasing can occur, for example, independently from each other (e.g., at different times). For example, the first assets can be purchased (860a) at a first time (e.g., Wednesday) and then the second assets can be purchased (860b) at a second time (e.g., Thursday).

In some examples, the purchase (860a) of the first assets is associated with a request by a participant of an insurance plan. The request by the participant can be, for example, a request to purchase units of the first insurance product. The participant is associated with the insurance product by the risk factors associated with the insurance product.

In some examples, the purchase (860b) of the second assets is associated with a request by a participant of an insurance plan. The request by the participant can be, for example, a request to purchase second units of the insurance product. The participant is associated with the insurance product by the risk factors associated with the insurance product.

In some examples, the first reinsurance company is a different company from the second reinsurance company. For example, the first reinsurance company is reinsurance company A 103a and the second reinsurance company is reinsurance company B 103b. In other examples, the first reinsurance company is the same company as the second reinsurance company. For example, the first reinsurance company and the second reinsurance company are both reinsurance company A 103*a*.

In other examples, the notification (885) by the insurance company Z 120 of the reinsurance company associated with the insurance product includes sending an electronic message to the reinsurance company associated with the insurance product. The notification can include, for example, a warning that the liabilities exceed or are less than the reserve assets for the particular insurance product, instructions to fix the reserve true-up issue within a specified timeframe (e.g., one day, one week), and/or a message indicating how the insurance company Z 120 is going to fix the reserve true-up so that reserve assets exceed or are less than liabilities for the particular insurance product.

In some examples, income payments for each insurance product associated with the insurance plan are calculated. The income payments can be, for example, the income earned from the units owned for each insurance product. The income payments can be, for example, associated with the participant's age (e.g., partial payments until the age of sixty, full payments after the age of sixty).

In other examples, a different insurance company manages and/or tracks the spread ratio of the reinsurance companies, allowances for the insurance company Z (e.g., payments, liabilities), assets by reinsurance company, reserves by reinsurance company, units by reinsurance company (e.g., by age, by year of purchase), liability cash flows by reinsurance company (e.g., monthly), investment cash flows by reinsurance company, deaths by reinsurance company, daily sales by reinsurance company, and/or any other information associated with the reinsurance companies. The information management and/or track by the different insurance company can be stored, for example, in storage modules (e.g., insurance product information 122, management information 126, asset information 128). Another advantage is that the other insurance company is managing and/or verifying the information associated with each insurance product to provide a higher level of safety for the participant and/or the participant's employer.

In some examples, the first reinsurance company and/or the second reinsurance company are compensated for providing the information to manage the first assets and the second assets, respectively. In some examples, the first reinsurance company and/or the second reinsurance company are compensated for providing the information to manage the liabilities (e.g., future payments) associated with the first insurance product and the second insurance product, respectively. In other examples, the first reinsurance company and/or the second reinsurance company are compensated for assuming the risks (e.g., failure of the investments) associated with the first insurance product and the second insurance product, respectively.

The compensation can be, for example, a predetermined percentage of the managed assets (e.g., one percent, one half of a percent). The compensation can be, for example, a fixed amount per unit of insurance product managed (e.g., one cent per unit), a fixed amount per insurance product managed (e.g., one hundred thousand dollars per insurance product), and/or any other type of compensation for managing insurance products. The compensation can be, for example, paid on a periodic basis (e.g., monthly, yearly) and/or as a one time fee (e.g., at the time of purchase). The compensation can be, for example, transmitted from the insurance company Z 120 to the managing reinsurance company (e.g., reinsurance company A 103*a*).

The risks can include, for example, credit risk, longevity risk, policyholder behavior risk, reinvestment risk, Asset Liability Management (ALM) risk, and/or any other type or risk associated with an insurance product.

In some examples, the risk factors include age, gender, geographic region (e.g., born, residing), profession, and/or any other type of risk factor associated with insurance.

In other examples, the insurance product includes an annuity, a fixed income annuity, a deferred fixed income annuity, a variable annuity, an equity indexed annuity, a fixed index annuity, an annuity associated with life insurance, an annuity associated with an investment, a mutual fund with an insurance based guarantee, and/or any other type of product associated with insurance.

In some examples, the insurance product is categorized according to risk. The risk can be, for example, an aggressive growth risk, an aggressive company risk, a moderate growth risk, a moderate company risk, a stable growth risk, a stable company risk, and/or any other type of risk associated with an investment for an insurance product.

In other examples, the insurance plan includes a qualified plan, a qualified retirement plan, a plan in which the insurance product is individually purchased, and/or any other type of plan associated with insurance.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:
1. A method for an insurer to offer an insurance plan to participants, comprising:
receiving, by a computing device of the insurer, a first plurality of bids from a first plurality of reinsurance companies, each bid including a price for a first unit of a first insurance product, the first unit of the first insurance product being associated with a first risk factor based on a participant characteristic;
selecting, from the first plurality of bids, by the computing device of the insurer, a first bid from a first reinsurance company, the first bid being the lowest bid of the first plurality of bids for the first unit;
receiving, by the computing device of the insurer, a second plurality of bids from a second plurality of reinsurance companies, each bid including a price for a second unit of a second insurance product, the second unit of the second insurance product being associated with a second risk factor based on the participant characteristic;
selecting, from the second plurality of bids, by the computing device of the insurer, a second bid from a second reinsurance company, the second bid being the lowest bid of the second plurality of bids for the second unit;
forming, by the computing device of the insurer, the insurance plan for the insurer including at least the first unit of the first insurance product and the second unit of the second insurance product; and offering, by the computing device of the insurer, the insurance plan to a first set of participants having the first risk factors at a first price equal to the first bid for the first unit and a second set of participants having the second risk factors at a second price equal to the second bid for the second unit, wherein the insurer purchases a first asset from the first reinsurance company based on an amount of the insurance plan necessary to cover the first units purchased by the first set of participants and a second asset from the second reinsurance company based on an amount of the insurance plan necessary to cover the second units purchased by the second set of participants.

2. The method of claim 1, further comprising:

receiving a request from one or more participants of the first set of participants for a purchase of one or more parts of the first unit or first units of the first insurance product associated with the first bid associated with the first reinsurance company;

updating assets and liabilities associated with the first insurance product based on the request; and updating information associated with each of the one or more participants associated with the request.

3. The method of claim 2, further comprising transmitting income payments to each of the one or more participants associated with the first insurance product for income earned from the units associated with each of the one or more participants.

4. The method of claim 3, wherein the transmitting the income payments further comprises transmitting, by the first reinsurance company, the income payments.

5. The method of claim 2, wherein the information associated with each of the one or more participants associated with the request comprises accumulated units purchased, a current value of the units purchased, a future income value of the units purchased, or any combination thereof.

6. The method of claim 2, further comprising transmitting a predetermined percentage of the assets to compensate the first reinsurance company associated with the first insurance product.

7. The method of claim 1, further comprising:

receiving, by a computing device of the insurer, a third plurality of bids from a third plurality of reinsurance companies, each bid including a price for a third unit of a third insurance product, the third unit of the third insurance product being associated with a third risk factor based on the participant characteristic;

selecting, from the third plurality of bids, by the computing device of the insurer, a third bid associated with from a third reinsurance company, the third bid being the lowest bid of the third plurality of bids for the third unit of the third insurance product;

receiving, by the computing device of the insurer, a fourth plurality of bids from a fourth plurality of reinsurance companies, each bid including a price for a fourth unit of a fourth insurance product, the fourth unit of the fourth insurance product being associated with a fourth risk factor based on the participant characteristic;

selecting, from the fourth plurality of bids, by the computing device of the insurer, a fourth bid from a fourth reinsurance company, the fourth bid being the lowest bid of the fourth plurality of bids for the fourth unit of the fourth insurance product;

forming, by the computing device of the insurer, the insurance plan for the insurer including at least the third unit of the third insurance product provided by the third reinsurance company and the fourth unit of the fourth insurance product provided by the fourth reinsurance company; and offering, by the computing device of the insurer, the insurance plan to a third set of participants having the third risk factor at a third price equal to the third bid for the first unit of the second insurance product and a fourth set of participants having the fourth risk factor at a fourth price equal to the fourth bid for the second unit of the second insurance product, wherein the insurer purchases a third asset from the third reinsurance company based on an amount of the insurance plan necessary to cover the third units purchased by the third set of participants and a fourth asset from the fourth reinsurance company based on an amount of the insurance plan necessary to cover the fourth units purchased by the fourth set of participants.

8. The method of claim 1, wherein the participant characteristic comprises age, gender, geographic region, profession, interest rate, or any combination thereof.

9. The method of claim 1, wherein the first insurance product comprises an annuity, an income fixed annuity, a deferred income fixed annuity, a variable annuity, an equity indexed annuity, an annuity associated with life insurance, an annuity associated with an investment, or any combination thereof.

10. The method of claim 1, wherein the insurance plan is part of a qualified plan, a qualified retirement plan, a plan in which the insurance product is individually purchased, or any combination thereof.

11. The method of claim 1, wherein prior to selecting the first bid from the first reinsurance company, further comprises:

determining, by the computing device, a rating for each reinsurance company; and removing, by the computing device, any bid from a reinsurance company having a rating below a threshold rating.

12. A computer program product, tangibly embodied in a machine-readable storage device, the computer program product including instructions being operable to cause a data processing apparatus of an insurer to:

receive a first plurality of bids from a first plurality of reinsurance companies, each bid including a price for a first unit of a first insurance product, the first unit of the first insurance product being associated with a first risk factor based on a participant characteristic;

select a first bid from a first reinsurance company, the first bid being the lowest bid of the first plurality of bids for the first unit;

receive a second plurality of bids from a second plurality of reinsurance companies, each bid including a price for a second unit of a second insurance product, the second unit of the second insurance product being associated with a second risk factor based on the participant characteristic;

select a second bid from a second reinsurance company, the second bid being the lowest bid of the second plurality of bids for the second unit;

form the insurance plan for the insurer including at least the first unit of the first insurance product provided by the first reinsurance company and the second unit of the second insurance product provided by the second reinsurance company; and offer the insurance plan to a first set of participants having the first risk factor at a first price equal to the first bid for the first unit and a second set of participants having the second risk factor at a second price equal to the second bid for the second unit, wherein the insurer purchases a first asset from the first reinsurance company based on an amount of the insurance plan necessary to cover the first units purchased by the first set of participants and a second asset from the second reinsurance company based on an amount of the insurance plan necessary to cover the second units purchased by the second set of participants.

13. The computer program product of claim 12, further including instructions being operable to cause the data processing apparatus to:

receive a request from one or more participants of the first set of participants for a purchase of one or more parts of the first unit or first units of the first insurance product associated with the first bid associated with the first reinsurance company;

update assets and liabilities associated with the first insurance product based on the request; and update information associated with each of the one or more participants associated with the request.

14. The computer program product of claim 13, further including instructions being operable to cause the data processing apparatus to:

transmit income payments to each of the one or more participants associated with the first insurance product for income earned from the units associated with each of the one or more participants.

15. The computer program product of claim 14, further including instructions being operable to cause the data processing apparatus to cause first reinsurance company to transmit the income payments.

16. The computer program product of claim 13, wherein the information associated with each of the one or more participants associated with the request comprises accumulated units purchased, a current value of the units purchased, a future income value of the units purchased, or any combination thereof.

17. The computer program product of claim 13, further including instructions being operable to cause the data processing apparatus to transmit a predetermined percentage of the assets to compensate the first reinsurance company associated with the first insurance product.

18. The computer program product of claim 12, further including instructions being operable to cause the data processing apparatus to:

receive a third plurality of bids from a third plurality of reinsurance companies, each bid including a price for a third unit of a third insurance product, the third unit of the third insurance product being associated with a third risk factor based on the participant characteristic;

select a third bid associated with from a third reinsurance company, the third bid being the lowest bid of the third plurality of bids for the third unit of the third insurance product;

receive a fourth plurality of bids from a fourth plurality of reinsurance companies, each bid including a price for a fourth unit of a fourth insurance product, the fourth unit of the fourth insurance product being associated with a fourth risk factor based on the participant characteristic;

select a fourth bid from a fourth reinsurance company, the fourth bid being the lowest bid of the fourth plurality of bids for the fourth unit of the fourth insurance product;

forming, by the computing device of the insurer, the insurance plan for the insurer including at least the third unit of the third insurance product provided by the third reinsurance company and the fourth unit of the fourth insurance product provided by the fourth reinsurance company; and offer the insurance plan to a third risk factor at a third price equal to the third bid for the first unit of the second insurance product and a fourth set of participants having the fourth risk factor at a fourth price equal to the fourth bid for the second unit of the second insurance product, wherein the insurer purchases a third asset from the third reinsurance company based on an amount of the insurance plan necessary to cover the third units purchased by the third set of participants and a fourth asset from the fourth reinsurance company based on an amount of the insurance plan necessary to cover the fourth units purchased by the fourth set of participants.

19. The computer program product of claim 12, wherein the participant characteristic comprises age, gender, geographic region, profession, interest rate, or any combination thereof.

20. The computer program product of claim 12, wherein the first insurance product comprises an annuity, an income fixed annuity, a deferred income fixed annuity, a variable annuity, an equity indexed annuity, an annuity associated with life insurance, an annuity associated with an investment, or any combination thereof.

21. The computer program product of claim 12, wherein the insurance plan is part of a qualified plan, a qualified retirement plan, a plan in which the insurance product is individually purchased, or any combination thereof.

22. The computer program product of claim 12, further including instructions being operable to cause the data processing apparatus, prior to selecting the first bid from the first reinsurance company, to:

determine a rating for each reinsurance company; and remove any bid from a reinsurance company having a rating below a threshold rating.

23. The method of claim 1, wherein the first reinsurance company and the second reinsurance company are the same reinsurance company.

24. The computer program product of claim 12, wherein the first reinsurance company and the second reinsurance company are the same reinsurance company.

25. The method of claim 1, wherein the first risk factor or the second risk factor is a value for the participant characteristic.

26. The method of claim 1, wherein:

the participant characteristic is age;

the first risk factor is a first numerical value for age; and the second risk factor is a second numerical value for age different than the first numerical value.

* * * * *

UNITED STATES PATENT AND TRADEMARK OFFICE
CERTIFICATE OF CORRECTION

| | | Page 1 of 1 |
|---|---|---|
| PATENT NO. | : 8,527,302 B2 | |
| APPLICATION NO. | : 11/964980 | |
| DATED | : September 3, 2013 | |
| INVENTOR(S) | : Johnson, Jr. et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1255 days.

Signed and Sealed this
Tenth Day of February, 2015

Michelle K. Lee
*Deputy Director of the United States Patent and Trademark Office*